United States Patent [19]

Claussen et al.

[11] 4,281,718

[45] Aug. 4, 1981

[54] METHOD OF RELEASING A SPRINKLER, AND A SPRINKLER HEAD ADAPTED TO THE METHOD

[75] Inventors: Lennart Claussen; Tore Boberg, both of Karlskoga, Sweden

[73] Assignee: Aktiebolaget Bofors, Bofors, Sweden

[21] Appl. No.: 39,525

[22] Filed: May 16, 1979

[30] Foreign Application Priority Data

Nov. 23, 1977 [SE] Sweden .............................. 7713209

[51] Int. Cl.³ ............................................. A62C 37/08
[52] U.S. Cl. ........................................ 169/41; 169/58
[58] Field of Search ...................... 169/37, 38, 40, 41, 169/42, 28, 56, 58, 60, 61; 102/42 R, 203

[56] References Cited

U.S. PATENT DOCUMENTS

| | | | |
|---|---|---|---|
| 369,840 | 9/1887 | Copeland | 169/38 |
| 2,723,722 | 11/1955 | Hicks | 169/37 |
| 3,726,217 | 4/1973 | Dedman et al. | 102/203 |
| 3,811,511 | 5/1974 | McCulloch | 169/41 |
| 3,967,255 | 6/1976 | Oliver et al. | 169/61 |
| 3,996,865 | 12/1976 | Dwyer | 102/42 R |
| 4,027,302 | 5/1977 | Healey et al. | 169/61 |

*Primary Examiner*—Robert J. Spar
*Assistant Examiner*—Kenneth Noland
*Attorney, Agent, or Firm*—Pollock, Vande Sande & Priddy

[57] ABSTRACT

A method and apparatus for releasing a sprinkler head (1, 2, 3, 5, 6, 7, 8) are disclosed in which a compacted body (14) of fine particles of a material such as antimony is shot by means of a radiation responsive detector (16, 17, 18) and detonator (9, 10, 11, 12, 13) into contact with a hollow glass bulb (4) which normally prevents operation of the sprinkler, thereby shattering the bulb, disintegrating the compacted body and releasing the sprinkler.

6 Claims, 1 Drawing Figure

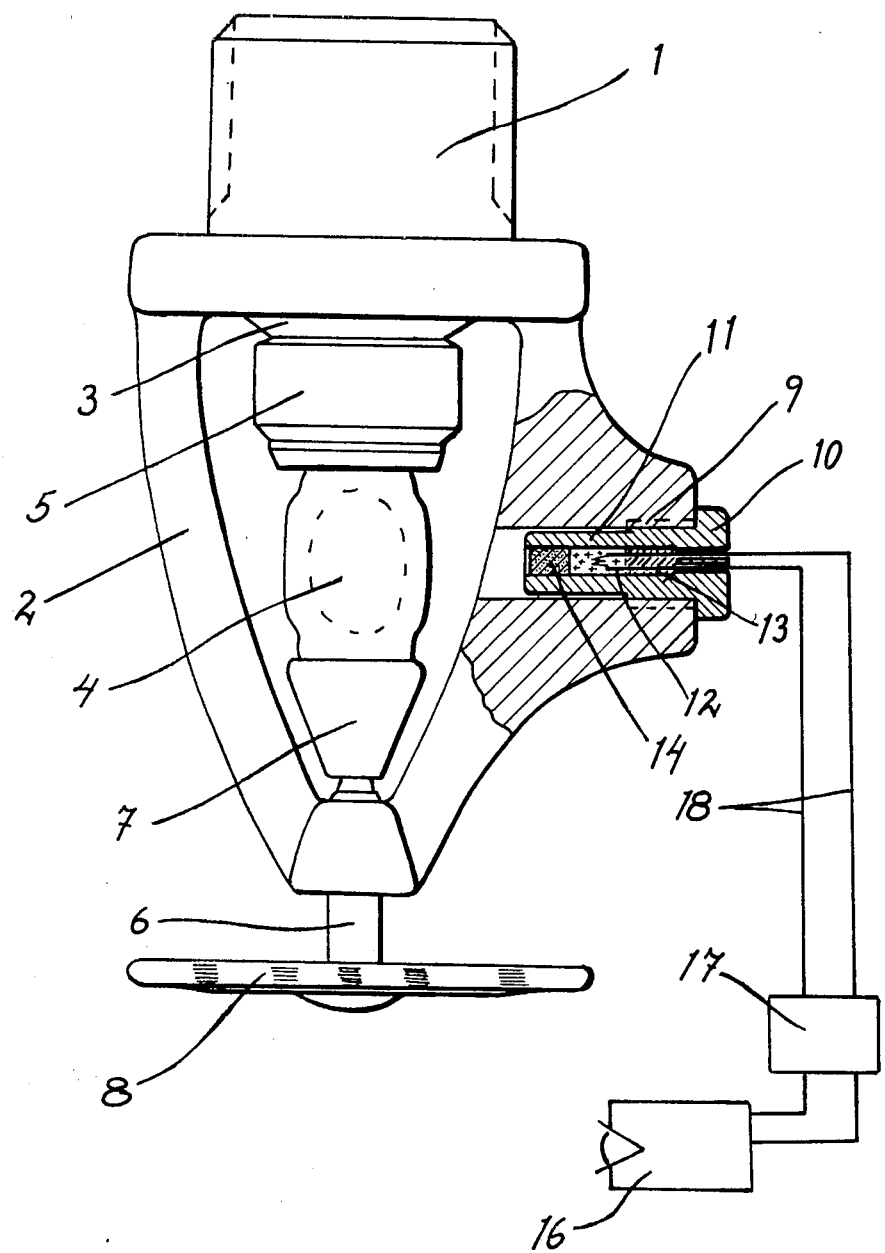

4,281,718

METHOD OF RELEASING A SPRINKLER, AND A SPRINKLER HEAD ADAPTED TO THE METHOD

TECHNICAL FIELD

The present invention relates to a method of achieving extremely rapid release of a sprinkler system. The invention also comprises a sprinkler head adapted to the method.

BACKGROUND ART

Fire protection systems of the sprinkler type are, in principle, of two somewhat different kinds. The first one is the so-called dry pipe system, in which the water is released by a detector-controlled main valve and flows out into the pipes to the various sprinkler heads. Systems of this type are not particularly rapid, since the water has to travel a rather long way before it reaches the sprinkler heads. The other system is the so-called wet pipe system, in which there is already water at the sprinkler heads which, in turn, are provided with separate sealing systems of one kind or another. The delay will then be limited to the action time of the sealing system itself or the system for initiating it. Temperature-sensitive systems based upon this principle have been in rather common use for more than 20 years. These temperature-sensitive sealing or blocking systems are as a rule based upon either low-temperature-sensitive soldering joints or hollow glass bulbs filled with some appropriate chemical substance, primarily a liquid, which at an increased temperature breaks the bulb from the inside and thereby releases the blocking of the outlet nozzle of the sprinkler head.

Both of these blocking systems are considered to be reliable, but altogether too slow for use in premises classified as high piled storage risks, such as in the explosives industry, in cellular plastics and paint factories, and so forth. In such cases, considerably more rapid systems are required, which need not wait for a rise in temperature in the premises.

Today, flame detectors are known which operate within the ultra-violet range, entirely undisturbed by normal sunlight. Such flame detectors do indeed give signals of varying strength for different types of flames, but the signal can easily be amplified so that it can be used for releasing a valve of one kind or another.

In the endeavours to achieve a particularly rapidly released electrically controlled sprinkler valve, it has also been proposed to have the valve released by an electrically initiated detonator. The basic design of the type hitherto tested corresponds to that of the previously mentioned sprinkler head, with the glass bulb complemented with a displaceable piston directed in a guide towards the central part of the bulb which, by the initiation of an electric detonator applied behind the piston, is thrown forwards against the bulb, to crush it. However, experience has shown that this piston must be very accurately controlled in its movement towards the bulb, in order to crush it completely. If the body of the hollow bulb should be crushed on one side only, the remaining parts can continue to block the outlet for the water. It should be noted that the glass bulb must be comparatively strong in order to be able to hold the water pressure, while the dimensions of the piston must be limited and the detonator must have the smallest possible charge.

The piston and its guide must also be made with close tolerances, as the so-called bureau drawer effect is otherwise quite liable to jeopardize the function of the device.

DISCLOSURE OF THE INVENTION

It has now been found, quite surprisingly, that an infinitely more reliable device will be obtained if the piston is replaced by a body made of compacted fine-particle material, which is fired in the direction towards the bulb by the detonator. As this freely flying body, when it hits the bulb, is also broken up into small pieces, i.e. into the original particles, there is no danger involved, even at a very short distance from the sparkler head. Careful testing has also shown that this design requires considerably less accurate aiming of the direction of movement of the fired body towards the centre of the bulb. In fact, even with purposely achieved half misses, the bulb has been blown away completely.

If particles with a high density are used, in certain cases at least, it should also be quite sufficient to use a composition of non-compacted particles which is fired by the detonator as one unit against the blocking system which is to be knocked away. As a rule, it is then appropriate to use somewhat more coarse-grained particles and/or to give them a somewhat higher initial velocity than that which has proved to be appropriate for compacted bodies of particles.

BRIEF DESCRIPTION OF THE DRAWINGS

The method and the device according to the invention have been defined in more detail in the following claims, and will also be further described with reference to the accompanying FIGURE, which shows a partly cut-away plan view of a device according to the invention.

BEST MODE CARRYING OUT THE INVENTION

The sprinkler head according to the invention comprises of a nozzle or outlet part 1, intended to be screwed on to the end of the feed pipe for water. A bow 2 fixed to the outlet part extends in front of this in the direction of flow of the water. Between the bow and the nozzle 3 of the outlet part a hollow glass bulb 4 is inserted. The bulb 4 is in contact with the nozzle 3 of the outlet part via a sealing cover 5 while its opposite side is in contact with an adjusting cap 7 which can be displaced by means of a screw 6 towards and away from the nozzle 3. At the screw 6 there is also arranged a spreading plate 8 for splitting up the jet of water, and which at the same time functions as a grip for the screw 6 when this is to be turned. With the aid of the screw 6, the sealing cap 5 can thus be set in place over the nozzle 3 with the glass bulb 4 as an intermediate part. When the bulb 4 is crushed, the sealing cap 5 is instantly pressed away from the nozzle 3, and the water flows out.

In the part of the bow 2 shown cut away in the FIGURE, a hollow threaded barrel or holder 9 is applied, into which a detonator or electric igniter 10 is screwed the detonator also being shown in a cut-away view. The detonator comprises a case 11 in which is applied an electric ignition composition 12, the electric leads of which in the rear part of the igniter are surrounded by electrical insulation 13, and in front of the electric ignition composition there is applied a body 14 consisting of compacted fine-particle material, such as antimony particles, which have not been compressed harder but that the particles still retain their identity, even if the body of particles itself is coherent. For example, particles with a mean diameter of 3.75 μm can be compacted to a density of approximately 5 g/cm³ and yet retain their identify.

When the detonator is screwed into place, the body of particles is just inside an opening 15 directed towards the central part of the bulb.

The initiator system is not comprised in the invention, and therefore, only in order to give a complete picture of the complete system, it has been shown indicated by an ultra-violet-sensitive detector 16 and an amplifier 17 from which the ignition current via the conductor 18 is fed to the detonator 10.

At present, a reliable method of indicating a fire is use an ultra-violet detector operating within the wave length range of 2,000–2,500 Å. Such a detector will not be disturbed by incident sunlight, any artificial illumination, or heat radiation from local heating or machinery. On the other hand, such an ultra-violet detector will respond to every type of open flame.

When the electric ignition composition of the detonator via the amplifier 17 has been initiated by the detector 16, the body 14 of particles is thrown with a very high velocity against the bulb 4, which is crushed, which involves that the sealing cap 5 looses its support and falls away, and water then instantly begins to flow out. At the same time as the bulb is crushed, the body of particles is broken up into the original particles.

The total reaction time for this device, which has proved to be very reliable, from the observation of the flame until the extinguishing liquid has reached the spreading plate 8, is only some twenty or thirty milliseconds.

If it is desired to supplement the releasing via a detector with a conventional temperature release, it is of course possible to use a conventional bulb filled with a liquid which is strongly expanding within the temperature interval desired, of the kind previously described.

It should also be noted that the technical and safety advantages achieved with such a combination of electric release via a flame detector and a strictly thermal release are extremely desirable.

The invention has been discussed above in connection with a conventional sprinkler system for water, but it can of course also be combined with other now used or future extinguishing means, for instance a halogen extinguisher.

We claim:

1. A method for releasing a fire-protection sprinkler of the type comprising a sprinkler head in which a frangible element normally prevents escape of the extinguishing medium through the sprinkler head, comprising the steps of:
   providing a compacted body of fine, non-explosive particles by compressing separate particles to form a coherent body in which the separate particles retain their identity; and
   impelling said compacted body into contact with said frangible element upon detection of conditions indicating the presence of a fire, whereby said frangible element is is shattered sufficiently to release said extinguishing medium and said compacted body is substantially entirely disintegrated into particles of such a size that danger due to flying particles is reduced at short distances from the sprinkler head.

2. A method according to claim 1, wherein said compacted body is impelled by means of an explosive detonator electrically actuated upon detection of said conditions.

3. Apparatus for releasing a fire protection sprinkler of the type comprising a sprinkler head in which a frangible element normally prevents escape of the extinguishing medium through the sprinkler head, said apparatus comprising:
   a compacted, coherent body of fine, non-explosive particles in which the separate particles retain their identity;
   means supported by said sprinkler head for impelling said compacted body into contact with said frangible element upon detection of conditions indicating the presence of a fire; and
   means responsive to the presence of a fire for actuating said means for impelling, whereby said frangible element is shattered sufficiently to release said extinguishing medium and said compacted body is substantially entirely disintegrated into particles of such a size that danger due to flying particles is reduced at short distances from the sprinkler head.

4. Apparatus according to claim 3, wherein said sprinkler head comprises a bow which extends near said frangible element, and said means for impelling said compacted body comprise a detonator supported by said bow.

5. Apparatus according to claim 4, wherein said bow comprises a hollow barrel aimed at said frangible element, said compacted boy and said detonator being located in said barrel.

6. Apparatus according to claim 3, wherein said compacted body comprises compacted antimony powder with a mean particle diameter of 3.75 μm which has been compacted to a density of approximately 5 g/cm³.

* * * * *